United States Patent
Beuk et al.

(10) Patent No.: US 6,298,480 B1
(45) Date of Patent: *Oct. 2, 2001

(54) SYSTEM FOR DISTRIBUTING COMPUTER PROGRAMS

(75) Inventors: Leonardus G. M. Beuk, Eindhoven (NL); Marie L. Van Tatenhove, San Jose, CA (US)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/752,363

(22) Filed: Nov. 19, 1996

(30) Foreign Application Priority Data

Nov. 20, 1995 (EP) .................................. 95203167

(51) Int. Cl.⁷ ........................................ G06F 9/445
(52) U.S. Cl. ............................... 717/11; 709/217
(58) Field of Search ................ 395/712, 200.51, 395/200.52, 186; 380/255, 270, 271; 713/150, 162, 163; 709/200, 217, 223; 717/11

(56) References Cited

U.S. PATENT DOCUMENTS

| | | | |
|---|---|---|---|
| 4,442,486 | 4/1984 | Mayer | 364/200 |
| 4,454,594 | 6/1984 | Heffron et al. | 364/900 |
| 5,008,814 | * 4/1991 | Mathur | 709/221 |
| 5,388,211 | * 2/1995 | Hornbuckle | 395/200 |

FOREIGN PATENT DOCUMENTS

WO 89/08369 * 9/1989 (WO) .................. H04Q/7/00

OTHER PUBLICATIONS

Mathias et al., "The ABCs of PCS", Network World, Nov. 1994, pp 53–54.*
Greengard, "E–Mail: Using your connections", Personal Journal, Sep. 1995, pp 161–165.*

* cited by examiner

Primary Examiner—Kakali Chaki
(74) Attorney, Agent, or Firm—Gregory L. Thorne

(57) ABSTRACT

In the system, computer programs are distributed by a host system (100) to a plurality target systems (200, 201, 202). The host system stores a plurality of different computer programs in a first storage means (110). Selection means (120) are used to selecting a computer program from the stored computer programs. Transmission means (130) simultaneously transmit the selected computer program to a plurality of target systems via a data communication medium. Reception means (310) in the target system receive a computer program transmitted via the data communication medium. Storing means (320) automatically store a received computer program in second storage means (330). The target system uses execution means (340) to execute a user-selected computer program stored in the second storage means (330). Preferably, each target system is assigned a unique target identifier. Before transmitting a selected computer program, the transmission means transmit activation information incorporating target identifiers. The reception means receive the activation information and only receive a following computer program if the activation information incorporates a target identifier which matches the assigned target identifier uniquely identifying the target system.

26 Claims, 6 Drawing Sheets

SYSTEM FOR DISTRIBUTING COMPUTER PROGRAMS

FIELD OF THE INVENTION

The invention relates to a system for distributing computer programs, comprising a host system and a plurality of target systems; said host system comprising: first storage means for storing a plurality of different computer programs; selection means for selecting a computer program from said plurality of computer programs stored in said first storage means; transmission means for simultaneously transmitting a computer program, selected by said selection means, to a plurality of said target systems via a data communication medium; and each of said target systems comprising: second storage means for storing at least one computer program; reception means for receiving a computer program transmitted via said data communication medium, storing means for storing a computer program received by said reception means in said second storage means; and execution means for executing a user-selected computer program stored in said second storage means.

The invention further relates to a target system for downloading computer programs comprising: second storage means for storing at least one computer program; reception means for receiving a computer program transmitted via a data communication medium, storing means for storing a computer program received by said reception means in said second storage means; and execution means for executing a user-selected computer program stored in said second storage means.

The invention further relates to a receiving apparatus.

BACKGROUND OF THE INVENTION

With the successful penetration of game computers and personal computers into the consumer market, the need for distributing computer programs to a large customer base is increasing. In addition to distribution via conventional retail outlets or direct mail, the need arises for direct distribution from the supplier to the customer. Such a system is already known from the distribution of computer programs via FM radio. Radio programs oriented towards computer users broadcast computer programs during the radio program. Typically, the computer programs are written in the BASIC programming language. The text of such programs is modulated in the audible frequency range (beeps). In the studio, the computer programs are stored in a modulated form on a medium, such as a tape recorder. Typically, the presenter of the program announces the transmission of a computer program. The interested audience, listening to the program using a conventional audio tuner, gets the opportunity to load a cassette into a conventional audio cassette recorder. In the studio, the operator ensures that the right medium is loaded. If several programs are stored on a tape, the operator ensures that the tape is wound to the beginning of the program to be transmitted. The actual transmission of the computer program is preceded by a period of silence, allowing the audience to start the actual recording. The transmission itself takes place using conventional studio equipment and radio transmitters. Once the transmission has completed, indicated by a second period of silence, the interested audience stops the recording. Afterwards, the audience can remove the cassette, load the cassette into a data recorder for the computer, load the recorded program into the computer and run the program. The processor of the computer executes the program by interpreting the BASIC text.

This system has several drawbacks. The system is difficult to operate by the user, since the user has to perform several manual operations, such as tuning to the required station and starting and stopping of the recording at the right time. The user also needs to listen to the program, select the computer program to record and remember which program was recorded on a specific storage medium (or make a note of that). As such the system does not lend itself for distribution of computer programs on a professional basis, particularly not to the general public. Commercial use of the system is further hindered by the fact that a transmitted program can be received free of charge by the entire audience.

SUMMARY OF THE INVENTION

It is an object of the invention to provide a system, target system and receiving apparatus of the kind set forth which is easier to operate by the user, opening the way to commercial distribution of computer software.

To achieve this object the system according to the invention is characterized in that said storing means is conceived to automatically store said computer program in said second storage means. This makes the system considerably easier to operate by the user. The user no longer needs to start and stop the recording and, consequently, the user needs no longer to be present at the moment of the transmission.

A first embodiment of a system according to the invention is characterized in that each target system is assigned a target identifier, which uniquely identifies said target system with respect to said communication medium; in that said first storage means is conceived to store for each computer program a corresponding list of target identifiers; in that said transmission means is conceived to, before transmitting said selected computer program, transmit via said communication medium activation information incorporating target identifiers which are on said corresponding list of target identifiers; in that said reception means is conceived to receive via said communication medium activation information and to only receive a following computer program if said received activation information incorporates a target identifier which matches said assigned target identifier uniquely identifying said target system. By uniquely identifying each target system, the target systems can be individually activated, ensuring that only a selected group of target systems actually receives the transmitted computer program. It should be noted that it is known from conventional local area networks to download software from a host system to a target system, by individually addressing a target system and transmitting the program. This is repeated for each target system, which needs to receive the program. As a consequence, the, relatively long, program is transmitted several times, wasting bandwidth of the communication system. Some local area systems allow so-called multi casting in which a message can be transmitted to a group of target systems. In these systems, however, the groups (and the corresponding group addresses) are predetermined, implying that the host system no longer can effectively control to which individual target system a specific message is sent.

A further embodiment of a system according to the invention is characterized in that said host system comprises subscription means for adding target identifiers to or removing target identifiers from said lists of target identifiers stored in said first storage means, and for controlling said transmission means to transmit a computer program stored in said first storage means at regular intervals. The subscription facilities ensure that a selected computer program is transmitted to target systems which have subscribed, whether or not against payment, to the program. The program is transmitted at regular intervals, which may be specific for each program.

A further embodiment of a system according to the invention is characterized in that said second storage means is conceived to store a first code; and said storing means is conceived to read said first code and to only store a received computer program in said second storage means if said first code matches a predetermined code. In this way, the chance of misuse of the system, by unauthorized target systems receiving a computer program, is reduced. Particularly, if the second storage means is removable, the subscribers can easily be supplied with a second storage means which is preloaded with the first code. The received program is only stored if the first code matches a predetermined code. Particularly, for a commercial operator this opens the way to distribute authorized second storage means at a required pricing level, which may or may not include the subscription fee.

A further embodiment of a system according to the invention is characterized in that said second storage means is conceived to store a subscription code; said first storage means is conceived to store for each computer program a corresponding program identifier; said transmission means is conceived to transmit said selected computer program in combination with said corresponding program identifier via said communication medium; in that said reception means is conceived to receive a computer program in combination with an associated program identifier via said communication medium; and said storing means comprises means for reading said subscription code and said storing means is conceived to only store a received computer program if said received associated program identifier matches said subscription code. This reduces the chance of misuse of the system even further, since it is possible to reissue second storage means with a different subscription code. Additionally, this enables a commercial operator to distribute authorized second storage means for each different service offered by the operator.

A further embodiment of a system according to the invention, wherein said second storage means is of a removable type and said target system comprises berth means for said second storage means, is characterized in that: said target system comprises third storage means for storing at least one received computer program; said storing means is conceived to store a computer program, received by said reception means, in said third storage means, and, when said second storage means is present and said subscription code stored in said second storage matches a program identifier associated with a computer program stored in said third storage means, to store said associated computer program in said second storage means. The use of an additional third storage means ensures that a computer program can also be received if the removable second storage means is not present at the moment of transmission.

A further embodiment of a system according to the invention, is characterized in that, said second storage means is conceived to store a counter and said storing means is conceived to store said received computer program only if said counter differs from a predetermined value and to change the value of said counter each time it stores a received computer program. The use of the counter, which, for instance, is decremented each time a received program is stored in the second storage means, opens new marketing possibilities. As an example, it is possible to supply with the target system as a demonstration a second storage means, such as a chip-card, which can only be used once. For promotion purposes, chip-cards can be supplied which can only be used a limited number of times. Also, a subscription fee may be included in the purchasing price of the second storage means, where the price relates to the number of times the storage can be used.

A further embodiment of a system according to the invention is characterized in that said target system comprises user interface means and said reception means is conceived to indicate the reception of a computer program via said user interface means. Since the user no longer needs to be controlling the actual recording, it is convenient for the user to be informed that a computer program has been received.

A further embodiment of a system according to the invention is characterized in that said data communication medium comprises a paging network; said host system is conceived to transmit paging messages via said transmission means; and said target system is conceived to receive paging messages via said reception means. A paging network offers means for very cost-effective distribution of data to many target systems in a wide area. As such a paging network is very suited for commercial distribution of software. An additional advantage is that the conventional messaging services offered by a paging network can be maintained and integrated into the system.

A further embodiment of a system according to the invention is characterized in that said storing means is conceived to store a paging message, received by said receiving means, in said second storage means; and said target system further comprises means for selecting a paging message from paging messages stored in said second storage means and for displaying said selected paging message. Advantageously, the storage facilities of the target system are used for storing conventional paging messages, reducing the additional costs of the paging facilities.

A further embodiment of a system according to the invention, wherein said target system comprises a combined apparatus comprising said execution means, said reception means, said storing means, said second storage means and display means; and wherein said execution means is conceived to display results of executing a selected computer program via said display means, is characterized in that said reception means is conceived to display paging messages received by said reception means via said display means. By using the display facilities, which the target system uses for displaying the results of executing a program, also for displaying the paging messages, the additional costs of the paging facilities are reduced even further.

A further embodiment of a system according to the invention, wherein said second storage means is of a removable type and wherein said target system comprises: a receiving apparatus comprising said reception means, said storing means and first berth means for said second storage means; and a processing apparatus comprising said execution means, second berth means for said second storage means and first display means, wherein said execution means is conceived to display results of executing a selected computer program via said first display means; is characterized in that said receiving apparatus further comprises second display means; and in that said reception means is conceived to display paging messages received by said reception means via said second display means. By adding a display to the receiving apparatus, the receiving apparatus can be used to display paging messages in addition to receiving the computer programs.

A further embodiment of a system according to the invention is characterized in that said receiving apparatus comprises a radio. In this way the functionality of the receiving apparatus is increased at relatively low cost, since many parts can be shared, such as power supply, aerial and display.

A further embodiment of a system according to the invention, wherein said second storage means is of a removable type and said target system comprises berth means for said second storage means, is characterized in that said second storage means comprises a chip-card. A chip-card is a very cost-effective and convenient storage medium and is particularly suited for consumer use.

BRIEF DESCRIPTION OF THE DRAWINGS

These and other aspects of the invention will be apparent from and elucidated with respect to the embodiments shown in the drawings.

DETAILED DESCRIPTION OF THE PREFERRED EMBODIMENTS

Figure 1:
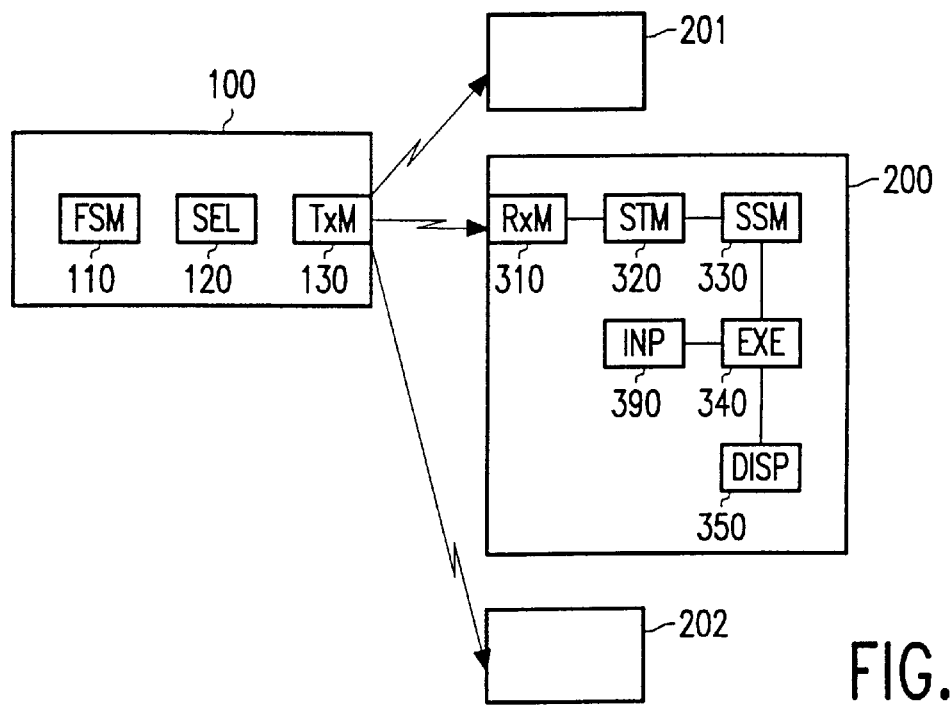
FIG. 1 shows a block diagram of a first embodiment of a system according to the invention.

FIG. 1 shows a block diagram of the system according to the invention. The system comprises a host system 100 and a plurality of target systems (200, 201, 202, . . . ). The host system 100 comprises first storage means 110 for storing a plurality of different computer programs. The first storage means 110 may be any type of storage means, such as magnetic or optical medium, suited for storing computer programs. The host system 100 further comprises selection means 120 for selecting a computer program from the programs stored in the first storage means 110. Transmission means 130 simultaneously transmits the selected program to a plurality of target systems using a communication medium. Such a form of transmission is usually referred to as broadcasting or multicasting. Typically, the host system 100 is implemented using a conventional computer, such as a personal computer or a workstation, extended with transmission facilities. The operating system of the computer, supported by the filing system and, if required, additional programs, allow a computer program to be selected and directed to transmission hardware for the actual transmission of the selected computer program.

Each target system, as shown in more detail in FIG. 1 for target system 200, comprises reception means 310 for receiving a computer program transmitted via the communication medium. Storing means 320 automatically store a received computer program in second storage means 330. Various approaches for automatic storing are well known. As an example, the reception means 310 may comprise an internal buffer, for receiving a computer program or part of a computer program. Once the reception means 310 has received a program or its reception buffer is full, the reception means 310 may issue a 'buffer full' signal indicating this to the storing means 320. The signal may be an interrupt. The storing means 320 may be actively polling for a 'buffer full' signal or be interrupted by the signal. In response to the signal or interrupt, the storing means 320 reads the contents of the reception buffer and stores the contents in the second storage means 330. If the reception buffer can only store part of a program, maybe only one byte, the storing means 320 ensures that the parts form one concatenated program in the second storage means 330. The second storage means 330 may be any type of storage means, such as a magnetic, electrical or optical medium, suited for storing computer programs.

Each target system further comprises execution means 340 for executing a program. The user of the target system may select which of the programs stored in the second storage means 330 is executed. The programs may be directly executable by the execution means 340, but may also comprise interpretable code, such as a program written in the BASIC programming language or a scripting language. If the program consists of interpretable code or a script, the execution means 340 may need to be loaded with a special interpretation program, such as a BASIC interpreter, before being able to interpret the Hi program. Each target system also comprises display means 350 for displaying the results of executing a program.

Typically, the target system 200 is implemented on a personal computer or game computer, extended with communication facilities for receiving transmitted computer programs. The processor of the computer is used to implement the execution means 340. The display means 350 are implemented using conventional computer display means, such as a CRT, LCD or graphics tablet. The storing means 320 may be partly implemented in software, in the form of device drivers, and partly in hardware, such as a harddisk controller. Advantageously, the software is executed by the processor of the computer.

Additionally, the target system 200 will typically comprise input means 390, such as a keypad. For game computers, it is advantageous to use a graphics tablet for the display means 350, which also allows input via a pen or finger-presses.

In a further embodiment of the system according to the invention, each target system is assigned a target identifier, which uniquely identifies the target system with respect to the communication medium. The target identifier can be seen as a unique communication address. The host system 100 stores for each computer program a corresponding list of target identifiers in the first storage means 110. It is well known how such information can be stored, for instance using arrays or pointer structures, in the form of, for instance, a file or a database.

Figure 2:
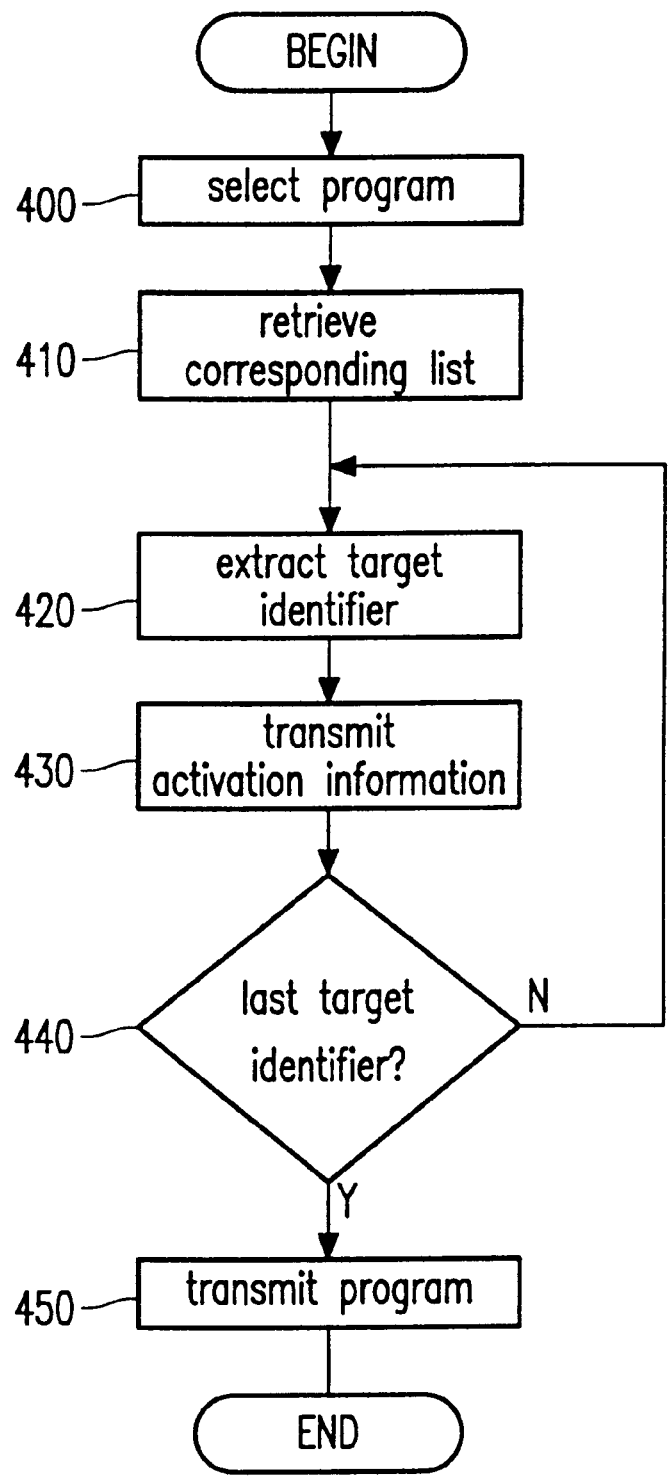
FIG. 2 shows a flow-chart of the activities in a host system.

FIG. 2 shows a flow-chart of the activities in the host system 100. First a computer program is selected 400 for transmission, using the selection means 120. Next, the list of target identifiers, which corresponds to the selected program, is retrieved 410. A target identifier is extracted 420 from this list. Next, the transmission means 130 are used to transmit 430 activation information via the communication medium in order to activate the target system, whose target identifier has been extracted from the list. As long as not all target systems have been activated 440, steps 420 and 430 are repeated for the remaining systems to be activated. Finally, the selected computer program is transmitted 450 using the transmission means 130. If the host system is implemented using a computer, advantageously, the processor of the computer is programmed to perform steps 400, 410, 420, 430, 440 and 450.

Figure 3:
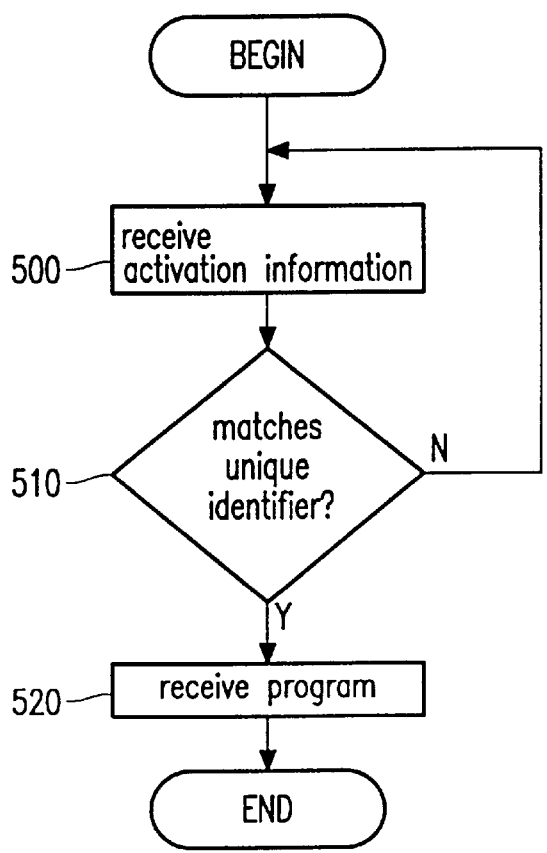
FIG. 3 shows a flowchart of activities in a target system.

FIG. 3 shows a flow-chart of the activities in the target system 200. The reception means 310 is used to receive 500 activation information via the communication medium. The target system tests 510 whether the activation information incorporates a target identifier, which matches the unique identifier of the target system. If so, the reception means 310 are used to receive 520 a following computer program.

Figure 4B:
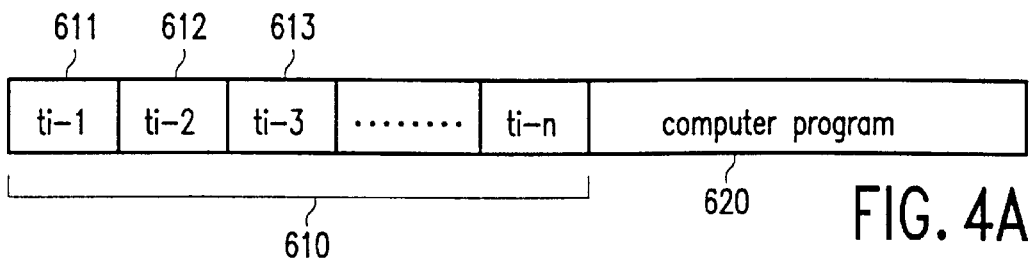
FIG. 4 illustrates a first communication frame format.
Figure 4B:
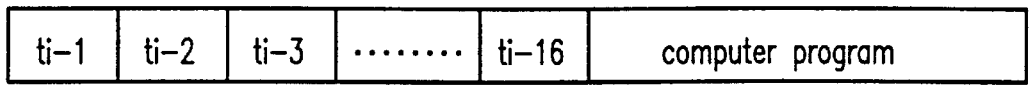
Figure 4B:
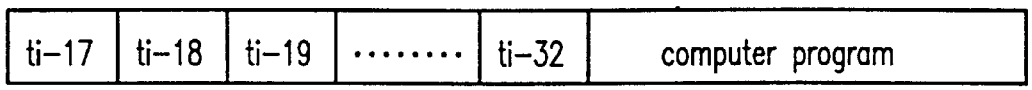
Figure 4B:
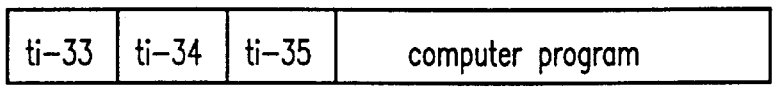

The activation information and the following computer program may be transmitted using various frame formats. FIGS. 4, 5 and 6 illustrate three alternative approaches. Persons skilled in the art will be able to design other frame formats as well. In FIG. 4A, a frame structure is shown comprising an addressing field 610 and a data field 620. The addressing field comprises a plurality of subfields 611, 612, 613, . . . , each comprising the target identifier of a different target system. The addressing field 610 will, typically, allow only a limited number of target identifiers to be specified in one frame. If more target systems, than can be specified in one frame, need to receive the program, several frames may need to be transmitted, each specifying a different group of target systems from the entire list of target systems corresponding to the program. Each of the frames may comprise the computer program, as shown in FIG. 4B. As an illustration, in FIG. 4B the maximum number of target system which can be specified in one frame is limited to 16, whereas a total of 37 target systems are on the list, requiring the transmission of three frames.

Figure 5A:
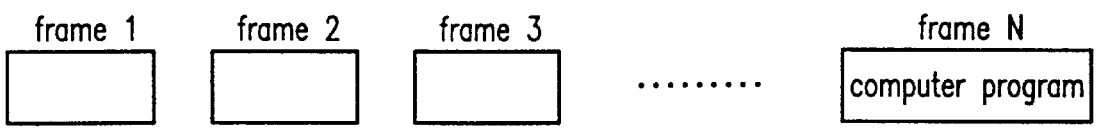
FIG. 5 illustrates a second communication frame format.
Figure 5B:
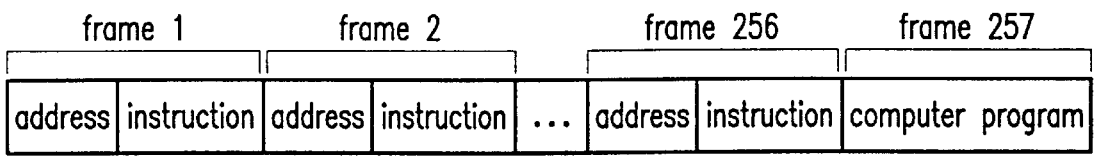
Figure 5C:
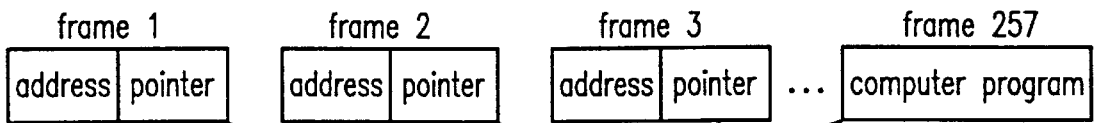
Figure 6:
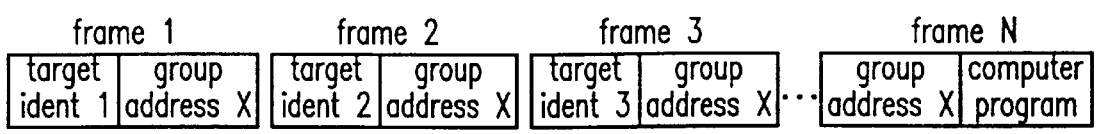
FIG. 6 illustrates a third communication frame format.

Instead of using one frame, which is common to some or all target systems, FIG. 5A illustrates an alternative approach, wherein a separate frame, indicated as frame 1, frame 2, . . . , is sent to each target system instructing the target system to receive a following computer program. The separate frames may be constructed in a conventional manner for communication systems, such as comprising an addressing field and a data field. The data field may then comprise the instruction. This approach is possible if each activated target system inherently knows how to locate the computer program in the received data stream. This can, for instance, be achieved by using a fixed super-frame structure in which a predetermined message frame is assigned for the transmission of the computer program. In FIG. 5B, an overall super-frame comprising 257 frames is used. As an example, the last frame, frame 257, is reserved for carrying the actual computer program. The preceding frames can be used to, for instance, activate up to 256 target stations. Alternatively, the target systems may be informed how to locate the computer program in the received data stream, for instance by specifying a frame or time slot (pointer), or some form of identification, such as a starting pattern, indicating the beginning of the transmission of the program. Figure SC illustrates the use of pointers.

In FIG. 6 a separate frame, indicated as frame 1, frame 2, etc. is sent to each target system instructing the target system to respond to messages comprising a specific group address in addition to messages comprising the unique target identifier. The separate messages may be constructed in a conventional manner, such as comprising an addressing field (specifying the target identifier) and a data field. The data field may then comprise the instruction and the group address. After activating all required target systems, a frame (frame N in FIG. 6) is sent, with the address field specifying the group address and the data field comprising the computer program. Using this approach, groups of target systems can be formed in a flexible manner, as required for each computer program.

It will be appreciated that the computer program may be too long to fit into one frame. It is well known how, in such a situation, the program can be split into several frames and concatenated by the target system. Using the approach of FIG. 5, first a message can be sent to a target system instructing the target system to become active (i.e. receive the computer program frames), followed by several frames comprising the computer program, and terminated by a message instructing the target system to become inactive. The receiving target system may also become inactive on its own initiative when it detects that it has received all data, for instance by checking a length indicator.

In order to activate a specific target system, it may not be necessary to transmit the exact target identifier of the target system. Particularly where a fixed superframe is used, part of the target identifier may inherently be related to the position in the frame structure. As an example, if the system of figure SB would be limited to a maximum of 256 target systems, then it is possible that each target system responds to only one of the first 256 frames (e.g. system 1 is responsive to frame 1, system 2 to frame 2, etc.) and that all activated target systems receive frame 257. In such a case, it is not required to explicitly transmit the target identifier, since this information is already inherently available. Using the same frame structure, it is also possible to support more than 256 target systems, such as 1024 target systems. In such a case, eight of the twelve address bits are inherent and the remaining four address bits could be specified in the message frame. As such, a target system would only become active if in its allocated frame (identifying eight address bits) the remaining four bits are specified.

It will also be appreciated that the frame structure shown in FIGS. 4, 5 or 6 may comprise other fields as well, such as starting and synchronising information, control fields, checksums, etc.

In addition to occasional distribution of software, such as updates of conventional computer programs to a large number of target systems, the system is particularly suited for regular distribution of software. The software may be distributed free of charge. Alternatively, the owners of the target systems may have to subscribe to the service. As an example of regular software distribution, a new horoscope program may be distributed every night. If the owner awakes in the morning and starts the game computer the new horoscope is available. Obviously, such a horoscope may also be distributed weekly or monthly. The same horoscope may be sent to all subscribers with the same birthday (day and month of the year). In such a case, only 365 horoscope transmissions are required to provide all subscribers with a new horoscope. Other examples of regular transmissions are: weather forecasts, sport results, soap operas, hit parade, TV program listings, and information regarding pop stars. By sending such information as a program and not as data, the system becomes very flexible. The entire operation of the program, such as the layout of the screen, can be changed instantly by transmitting a new program. This helps keeping the service attractive, particularly for relatively young consumers (children and teenagers).

Figure 7:
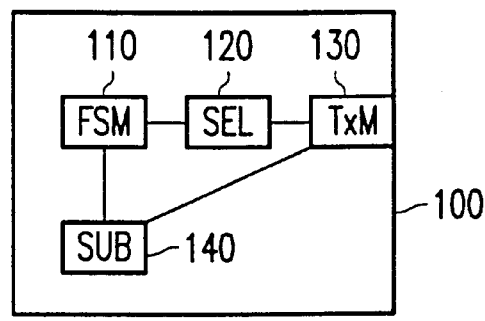
FIG. 7 shows a block diagram of a further embodiment of the host system.

As shown in FIG. 7, the host system 100 may comprise subscription means 140. If a user of a target system subscribes to the distribution of a specific computer program, the subscription means 140 are used to add the target identifier to the list of target identifiers corresponding to the computer program. The list is stored in the first storage means 110. Similarly, if the subscription ends, the subscription means 140 are used to remove the target identifier from the list of target identifiers. The subscription means 140 further controls the transmission means 130 to transmit a computer program stored in the first storage means 110 at regular intervals. The interval may be different for each program, making it beneficial to store time information, such as the interval, in the first storage means 110 as well or in other suitable storage means. If the host system is implemented using a computer, the subscription means 140 may be implemented by a program being executed by the computer's processor.

Figure 8:
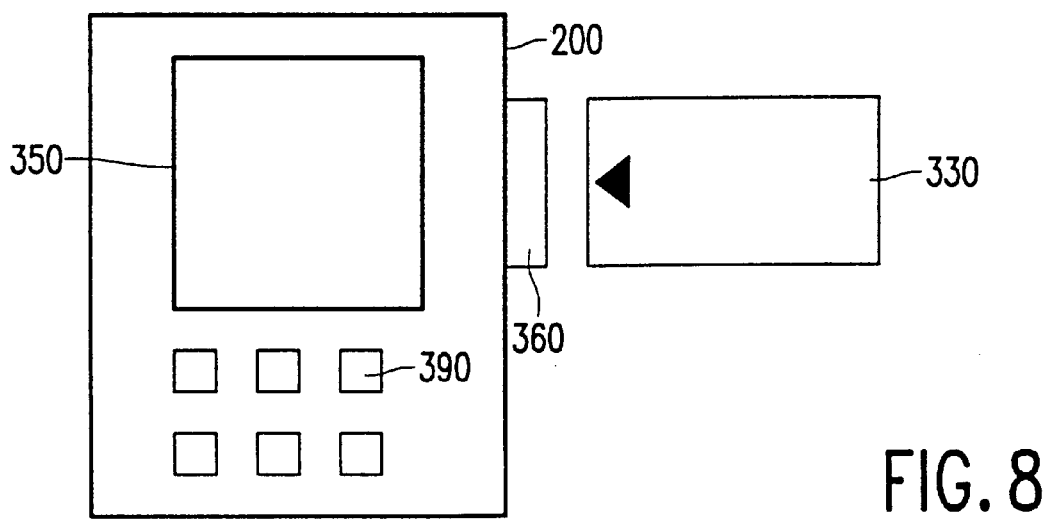
FIG. 8 shows a block diagram of a further embodiment of the target system.

FIG. 8 shows a further embodiment of the target system 200, wherein the second storage means 330 is removable. The target system 200 comprises berth means 360 for incorporating the second storage means 330. Any suitable form of removable storage may be used, such as a floppy-disk, a harddisk mounted in a removable tray, a PCMCIA-card comprising electrical or magnetic storage, or a chipcard comprising EEPROM.

In a further embodiment according to the invention, the second storage means 330 stores a first code. The storing means 320 of FIG. 1 reads the first code from the second storage means 330 and only stores a program received via the reception means 310 if the first code matches a predetermined code. It will be appreciated that it is not required that both codes are fully identical. Any applicable algorithm may be used to determine whether the codes match. The target system is supplied with the predetermined code. This code may, for instance, be embedded in a software program stored in a ROM of the target system or stored as data in ROM or EEPROM. The first code may already have been stored in the second storage means 310 when the target system is supplied. Advantageously, the second storage means 310 is removable. In this case, each second storage means 310 of an appropriate type fitting into the target system must be supplied with the first code in order to be accepted for storing a received computer program. This provides the supplier of the system a certain level of control over the supply and distribution of second storage means for use in such a target system. Normally, the supplier of the target system will be able to supply the second storage means exclusively or via authorized suppliers. To make it more difficult for unauthorized suppliers to supply second storage means, various methods, such as for instance used to hinder illegal copying of software, may be used to hinder copying of the first code. It will be appreciated, that the first code may be embedded in a program stored in the second storage means 310. As part of the execution of this program, the target system checks whether the embedded code matches the predetermined code of the target system. U.S. Pat. No. 4,442,486 and 4,454,594, herein incorporated by reference, describe such methods in more detail.

In a further embodiment of the system according to the invention, the host system 100 stores for each computer program a corresponding program identifier in the first storage means 110 or any other suitable storage means. The program identifier may take any form, ranging from a code, coded in the form of some bits or bytes, to a textual identification, coded as ASCII characters. The host system 100 uses the transmission means 130 to transmit a selected computer program in combination with the corresponding program identifier. It is well known how frame formats, such as shown in FIGS. 4, 5 and 6, can be adapted to accommodate the additional program identifier. If required, the program identifier may also be transmitted as a separate message. The target system 200 stores a subscription code in the second storage means 330 or any other suitable storage means. The reception means 310 receives a program identifier in combination with an associated program. It is well known how to correlate the program identifier and the associated program if the identifier and the program are transmitted in separate frames. The storing means 320 reads the subscription code and only stores the received computer program if the received associated program identifier matches the subscription code. Obviously, in order to match, the identifier and the code do not need to be identical. This embodiment allows different service providers, each distributing different software, to provide their own authorized second storage means 330. Advantageously, if the program identifier is transmitted prior to transmitting the program, the reception of the program can be disabled if no authorized second storage means is available in the target system 200, saving storage space.

Figure 9:
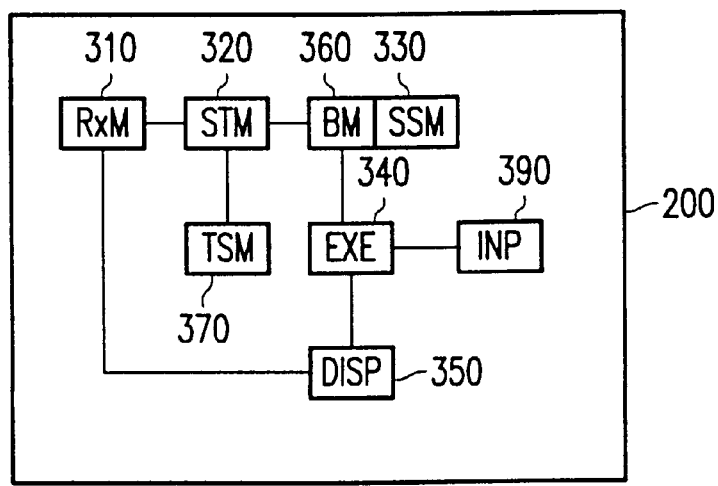
FIG. 9 shows a block diagram of a further embodiment of the target system.

In a further embodiment of the system as shown in FIG. 9, the target system 200 comprises third storage means 370. The storing means 320 store a received computer program together with the associated program identifier in the third storage means 370. When a removable second storage means 330 is inserted into the berth means 360 of the target system 200, the storing means 320 reads the subscription code stored in the second storage means 330. The storing means 320 then searches the third storage means 370 for a program with an associated program identifier matching the subscription code. If such a program is found, it is transferred to the second storage means. In this way, typically, a limited number of programs can be received, even if no second storage means 330 is present in the target system 200. Advantageously, the target system 200 offers the user facilities to select and discard a program stored in the third storage means 370 or to fully clear the third storage means 370.

In a further embodiment of the system, the second storage means 330 stores a counter. Before storing a received computer program, the storing means 320 checks the value of the counter. If the counter has reached a predetermined value, the storing means 320 does not store a received computer program. Instead, the storing means 320 may discard the program or, for instance, indicate to the user that a second storage means 330 with an adequate counter value needs to be inserted. If the counter differs from the predetermined value, the storing means 320 stores the received computer program and changes the value of the counter to reflect this. As an example, the second storage means 330 may initially be loaded with a counter with a high value, such as 10 or 100. Each time a program is stored, the counter is decremented. A newly received program is not stored if the counter has reached a certain value, such as zero or one. It should be noted that in this case the counter is an indication for how many times a program may be stored in the second storage means (the number of storing operations) and not how many programs may be stored in the storage simultaneously. As such, the removal of a program from the second storage means 330 does not result in incrementing the counter. Alternatively, the initial counter value may be low and incremented each time a program is stored until a certain value has been reached. Other schemes for changing the counter value and determining when the allowed maximum usage has been reached may be used as well. It will be appreciated that the counter may be stored in the second storage means in a conventional way, similar to storing the computer program. Alternatively, schemes, such as for instance known from telephone cards, may be used which destructively change the counter. In this way unintentional re-use of the second storage means 330, by giving the counter a different value once the counter has 'expired', may be avoided.

In a further embodiment of the system, the reception means 310 uses the display means 350 to indicate the reception of a program. If the associated program identifier is of a textual form, then, advantageously, the program identifier is displayed as well. In this way the user is instantly informed of the reception of a program and can immediately execute the program. Obviously, the reception may also be indicated using other user interface means, such as LEDs or audible beeps.

Figure 10:
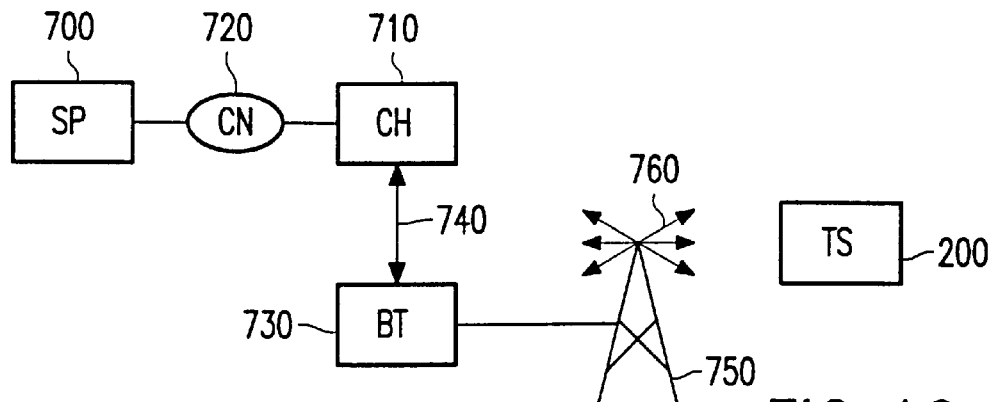
FIG. 10 shows a further embodiment of the system using a paging network.

As the data communication medium any suitable medium may be chosen, also depending on the area of distribution. As an example, if the distribution takes place within a building a Local Area Network may be used. Advantageously, wireless distribution, for instance using RF distribution, is used. If distribution is required over a wider area, such as a town, Medium Area Networks or cable networks for audio/video distribution may be used. Equipment, both hardware and software, for these forms of distribution are well known. For distribution in an even wider area, advantageously, a paging network is used. Paging has become a consumers product, resulting in the availability of very cost-effective paging receivers. Furthermore, paging networks use existing broadcasting networks for transmitting messages, requiring little additional investment to start a service for distributing software. As illustrated in FIG. 10, a service provider 700, typically, provides a computer program to be transmitted to a clearinghouse 710 for the paging network. Some form of a communication network 720 may be used to interconnect the service provider 700 and the clearinghouse 710. The clearinghouse 710 merges the supplied data with other data which also needs to be transmitted via the paging network. The clearinghouse 710 then supplies the merged data to a broadcast transmitter 730 in the locality of the receiving target system 200. The broadcast transmitter 730 typically also broadcasts FM radio and/or television programs. The connection between the clearinghouse and the broadcast transmitter may be based on a direct transmission line 740. The broadcast transmitter 730 uses a conventional transmission 10 tower 750 to transmit the paging signal 760. Typically, the paging signal 760 is modulated in such a way that it 'piggybacks' on an existing signal, such as the 19 kHz. FM pilot signal, being broadcast by the transmitter 730. A further beneficial effect of using a paging network for the distribution of computer software, is that this opens the way to benefit from the popularity of game computers and personal computers in combination with the emerging popularity of paging among young consumers. At this moment, paging networks only provide one service, mainly being the distribution of various forms of paging messages, such as coded or readable messages. The networks have no facilities for supporting two or more different services simultaneously.

Figure 11A:
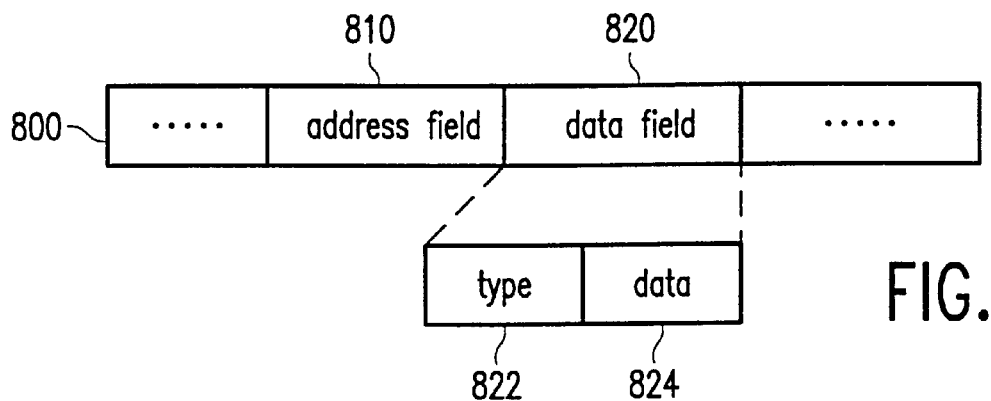
FIG. 11 illustrates a frame format for combining distribution of computer programs and paging messages.
Figure 11B:
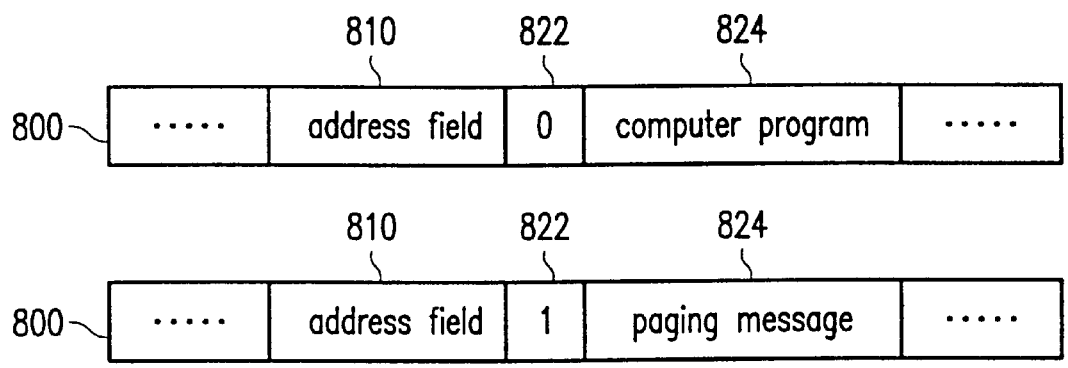

In a further embodiment of the system, the host system uses the transmission means 130 to transmit conventional paging messages to a target system, in addition to transmitting computer programs. The target systems use the receiving means 310 to receive conventional paging messages in addition to receiving computer programs. In order to differentiate between a computer program and a conventional paging message, an additional communication protocol is used. An example of such a protocol is shown in FIG. 11. In figure 11A, the frame 800 comprises a data field 820. The data field 820 is further divided into a subfield 822, indicating the type of data, and a subfield 824, comprising the actual data. If only two types of data need to be differentiated, it is in principle sufficient to only use one bit for the type field 822, where a first bit value indicates that the following data subfield 824 comprises a computer program and a second bit value indicates that the following data subfield 824 comprises a conventional paging message, as shown in FIG. 11B. It will be appreciated that other protocols may be used as well.

In principle, the service provider 700 of FIG. 10 can supply the paging service in addition to supplying the program distribution service. In such a case, the service provider ensures that the entire data field 820 is formatted correctly, according to the protocol chosen by the service provider. The advantage of this approach is that the service provider has full control over all data sent to the target system. A disadvantage is that it is difficult to combine the service supplied by this service provider with services supplied by other service providers or the clearinghouse. As an example, an existing paging service, using its own protocol, could cause problems, since the receiving target system might interpret such a paging message as a computer program. One way of solving this, is agreeing the protocol to be used for specific target systems (identified by their target identifier) with the clearinghouse. The clearinghouse then merges data supplied by different service providers or itself according to the protocol for the specific target system.

Figure 12:
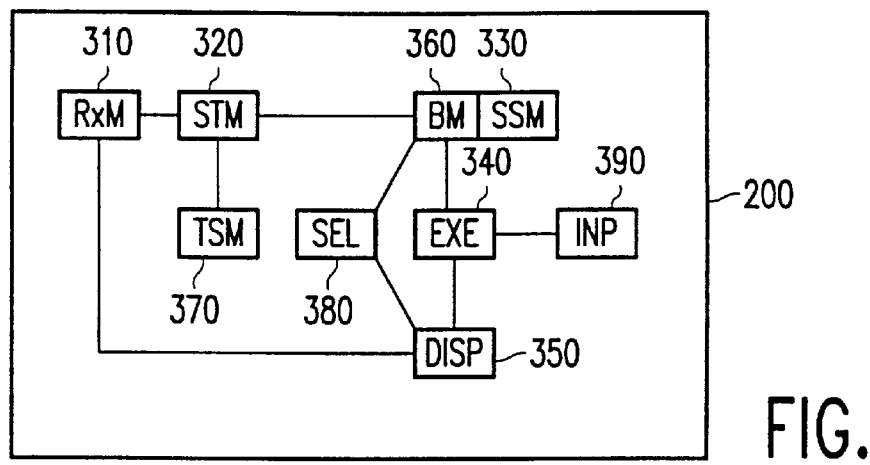
FIG. 12 shows a further embodiment of the target system.

In a further embodiment of the system as shown in FIG. 12, the target system 200 uses the storing means 320 to also store received paging messages in the second storage means 330 or any other suitable storage means. The target system 200 comprises selection means 380 for selecting a paging message from paging messages stored in the second storage means 330 and for displaying the selected message on the display means 350. For the selection conventional file manager programs can be used, executed by the execution means 340. Advantageously, a stored paging message comprises an attribute to differentiate it from a computer program or other forms of data. The attribute may the same as used in the communication protocol for differentiation. The use of the second storage means 330, which typically will be able to store many paging messages, has the advantage that a received paging message can be kept for a very long time and be retrieved whenever desired by the user. If the second storage means is removable, the received paging message can also be easily given to other people. The not yet published European patent application PHN 15352 describes a game computer with means for wirelessly communicating to a local group of game computers. Using such game computers, makes it possible to transmit a received paging message to, for instance, a friend in the near vicinity. It is also possible to process the paging message further on the computer. As an example, the paging message can be imported in a word processor and used in a letter.

Advantageously, the target system is implemented in the form of one combined apparatus. The shared use of the second storage means 330 and the display means 350 for both the computer programs and the paging messages results in a cost effective system.

Figure 13:
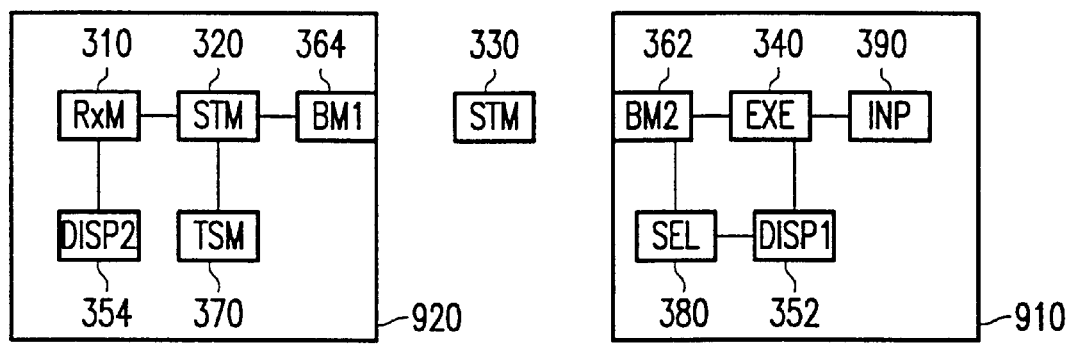
FIG. 13 shows a block diagram of the system implemented as a receiving apparatus and a processing apparatus.

Alternatively, the target system may be implemented in the form of a processing apparatus 910 and a receiving apparatus 920, as shown in FIG. 13. The processing apparatus 910 comprises the execution means 340, first display means 352 and second birth means 362 for the second storage means 330. The execution means 340 uses the first display means 352 for displaying the results of the execution of a program. Additionally, the first display means 352 may be used for displaying paging messages stored in the second storage means 330. The processing apparatus 910 may be any conventional personal computer or game computer with removable storage. The receiving apparatus 920 comprises the reception means 310, the storing means 320 and a first berth means 364 for the second storage means 330. Advantageously, the receiving apparatus 920 further comprises a second display means 354. This allows the reception means 310 to use the second display means 354 for displaying a received paging message. The concept of using a separate processing apparatus 910 and a receiving apparatus 920 has the advantage that the customer can first buy a conventional processing apparatus, at no extra costs, and at a later stage buy the receiving apparatus as an accessory.

Figure 14:
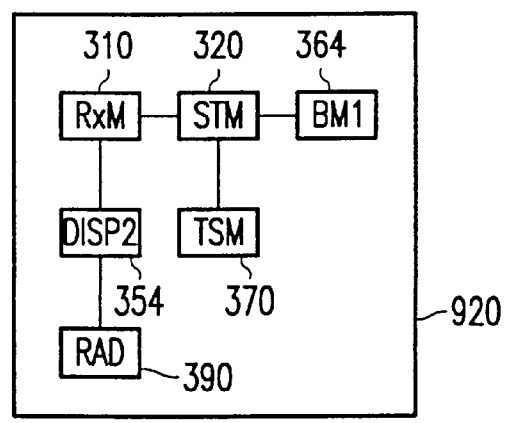
FIG. 14 shows a block diagram of a further embodiment of the receiving apparatus.

FIG. 14 shows a further embodiment, wherein the receiving apparatus 920 comprises a radio 390. By combining paging functionality with radio functionality in one apparatus a large amount of the functionality of the apparatus, such as the aerial, display and power supply, can be shared, reducing costs. Advantageously, the pager is combined with a clock radio. Since in paging networks, typically, most capacity is free during night time, it is beneficial to distribute computer programs overnight. By using a clock radio, as soon as the consumer awakes he can instantly see that new software has arrived.

What is claimed is:

1. A system for distributing computer programs, comprising
  a host system and a plurality of target systems;
  said host system comprising:
    first storage means for storing a plurality of different computer programs;
    selection means for selecting a computer program from said plurality of computer programs stored in said first storage means;
    transmission means for transmitting a single signal containing a computer program, selected by said selection means, simultaneously to each of said plurality of said target systems via a common data communication medium; and
  each of said target systems comprising:
    second storage means for storing at least one computer program;
    reception means for receiving the computer program transmitted via said common data communication medium,
    storing means for storing the computer program received by said reception means in said second storage means; and
    execution means for executing a user-selected computer program stored in said second storage means;
    characterized in that
    said storing means is conceived to automatically store said computer program in said second storage means.

2. A system as claimed in claim 1, characterized:
  in that each target system is assigned a target identifier, which uniquely identifies said target system with respect to said common communication medium;
  in that said first storage means is conceived to store for each computer program a corresponding list of target identifiers;
  in that said transmission means is conceived to, before transmitting said selected computer program, transmit via said common communication medium activation information incorporating target identifiers which are on said corresponding list of target identifiers;
  in that said reception means is conceived to receive via said common communication medium activation information and to only receive the computer program if said received activation information incorporates a target identifier which matches said assigned target identifier uniquely identifying said target system.

3. A system as claimed in claim 2, characterized in that said host system comprises subscription means
  for adding target identifiers to or removing target identifiers from said lists of target identifiers stored in said first storage means, and
  for controlling said transmission means to transmit the computer program stored in said first storage means at regular intervals.

4. A system as claimed in claim 1, characterized in that:
  said second storage means is conceived to store a first code; and
  said storing means is conceived to read said first code and to only store the computer program in said second storage means if said first code matches a predetermined code.

5. A system as claimed in claim 1, characterized in that:
  said second storage means is conceived to store a subscription code;
  said first storage means is conceived to store for each computer program a corresponding program identifier;
  said transmission means is conceived to transmit the computer program in combination with said corresponding program identifier via said common communication medium;
  said reception means is conceived to receive the computer program in combination with an associated program identifier via said communication medium; and
  said storing means comprises means for reading said subscription code and said storing means is conceived to only store the computer program if said received associated program identifier matches said subscription code.

6. A system as claimed in claim 5, wherein:
  said second storage means is of a removable type and said target system comprises berth means for said second storage means,
  said target system comprises third storage means for storing at least one received computer program; and
  said storing means is conceived to store the computer program, received by said reception means, in said third storage means, and, when said second storage means is present and said subscription code stored in said second storage matches a program identifier associated with the computer program stored in said third storage means, to store the computer program in said second storage means.

7. A system as claimed in claim 1, characterized in that,
  said second storage means is conceived to store a counter and
  said storing means is conceived to store the computer program only if said counter differs from a predetermined value and to change the value of said counter each time it stores the computer program.

8. A system as claimed in claim 1, characterized in that said target system comprises user interface means and said reception means is conceived to indicate the reception of the computer program via said user interface means.

9. A system as claimed in claim 1, characterized in that:

said common data communication medium comprises a paging network;

said host system is conceived to transmit paging messages via said transmission means; and said target system is conceived to receive the paging messages via said reception means.

10. A system as claimed in claim 1, wherein said second storage means is of a removable type and said target system comprises berth means for said second storage means, characterized in that said second storage means comprises a chip-card.

11. A system for distributing computer programs, comprising a host system and a plurality of target systems;

said host system comprising:

a first storage means for storing a plurality of computer programs;

selection means for selecting a computer program from said plurality of computer programs stored in said first storage means;

transmission means for transmitting a single copy of the computer program, selected by said selection means, simultaneously to each of said plurality of said target systems via a single data communication medium, and for transmitting paging messages; and each of said target systems comprising:

second storage means for storing the computer program;

reception means for receiving the computer program transmitted via said data communication medium, and for receiving paging messages;

storing means for storing the computer program received by said reception means in said second storage means; and execution means for executing a user-selected computer program stored in said second storage means, wherein said storing means is conceived to store a paging message, received by said reception means, in said second storage means; and said target system further comprises means for selecting a paging message from paging messages stored in said second storage means and for displaying said selected paging message.

12. A system as claimed in claim 11, wherein said execution means is conceived to display results of executing a selected computer program, and wherein said reception means is conceived to display the paging messages received by said reception means.

13. A system as claimed in claim 11, wherein said second storage means is of a removable type and wherein said target system comprises:

a receiving apparatus comprising said reception means, said storing means and first berth means for said second storage means; and a processing apparatus comprising said execution means, second berth means for said second storage means and first display means, wherein said execution means is conceived to display results of executing a selected computer program via said first display means, wherein said receiving apparatus further comprises second display means; and wherein said reception means is conceived to display paging messages received by said reception means via said second display means.

14. A system of claim 13, characterized in that said receiving apparatus comprises a radio.

15. A target system for downloading computer programs comprising:

storage means for storing at least one computer program;

reception means for receiving a computer program contained within a single signal simultaneously transmitted via a common data communication medium to each one of other target systems;

storing means for storing the computer program received by said reception means in said second storage means; and execution means for executing a user-selected computer program stored in said second storage means;

characterized in that:

said storing means is conceived to automatically store said computer program in said second storage means;

said target system is assigned a target identifier, which uniquely identifies said target system with respect to said common communication medium; and said reception means is conceived to receive via said common communication medium activation information and to only receive the computer program if said received activation information incorporates a target identifier which matches said assigned target identifier uniquely identifying said target system.

16. A target system as claimed in claim 15, characterized in that:

said second storage means is conceived to store a first code; and said storing means is conceived to read said first code and to only store the computer program in said second storage means if said first code matches a predetermined code.

17. A target system as claimed in claim 15, characterized in that:

said second storage means is conceived to store a subscription code;

said reception means is conceived to receive the computer program in combination with an associated program identifier via said common communication medium; and said storing means comprises means for reading said subscription code and said storing means is conceived to only store the computer program if said received associated program identifier matches said subscription code.

18. A target system as claimed in claim 17, wherein said second storage means is of a removable type, characterized in that:

said target system comprises third storage means for storing the computer program;

said storing means is conceived to store the computer program, received by said reception means, in said third storage means, and, when said second storage means is present and said subscription code stored in said second storage matches a program identifier associated with the computer program stored in said third storage means, to store the computer program in said second storage means.

19. A target system as claimed in claim 15, characterized in that, said second storage means is conceived to store a counter and said storing means is conceived to store the computer program only if said counter differs from a predetermined value and to change the value of said counter each time it stores the computer program.

20. A target system as claimed in claim 15, characterized in that said target system comprises user interface means and said reception means is conceived to indicate the reception of the computer program via said user interface means.

21. A target system as claimed claim 15, characterized in that:

said data communication medium comprises a paging network; and said target system is conceived to receive paging messages via said reception means.

22. A target system as claimed in claim 15, characterized in that said storage means comprises a chip-card.

23. A target system for downloading computer programs comprising:

storage means for storing at least one computer program;

reception means for receiving a single signal containing a computer program transmitted via a data communication medium simultaneously to each of a plurality of target systems including said target system, and for receiving paging messages;

storing means for automatically storing the computer program received by said reception means in said storage means; and execution means for executing a user-selected computer program stored in said storage means, wherein:

said storing means is conceived to store a paging message, received by said reception means, in said storage means; and said target system further comprises means for selecting a paging message from paging messages stored in said storage means and for displaying said selected paging message.

24. A system as claimed in claim 23, wherein:

said execution means is conceived to display results of executing a selected computer program, and said reception means is conceived to display paging messages received by said reception means.

25. A system as claimed in claim 23, wherein said storage means is of a removable type and wherein:

said target system comprises:

a receiving apparatus comprising said reception means, said storing means and first berth means for said storage means; and a processing apparatus comprising said execution means, second berth means for said storage means and first display means, wherein said execution means is conceived to display results of executing a selected computer program via said first display means, wherein said receiving apparatus further comprises second display means; and wherein said reception means is conceived to display paging messages received by said reception means via said second display means.

26. A target system as claimed in claim 25, characterized in that said receiving apparatus comprises a radio.

\* \* \* \* \*